United States Patent [19]

Rosthauser et al.

[11] Patent Number: 5,714,562

[45] Date of Patent: Feb. 3, 1998

[54] LIGHT STABLE ELASTOMERS HAVING GOOD DYNAMIC PROPERTIES

[75] Inventors: James W. Rosthauser, Glendale; Karl W. Haider, New Martinsville, both of W. Va.; Carl Serman, Cranberry Township, Pa.

[73] Assignee: Bayer Corporation, Pittsburgh, Pa.

[21] Appl. No.: 662,402

[22] Filed: Jun. 12, 1996

[51] Int. Cl.$^6$ .................................................. C08G 18/24
[52] U.S. Cl. ............................. 528/58; 528/48; 528/65
[58] Field of Search .......................... 528/58, 65, 48

[56] References Cited

U.S. PATENT DOCUMENTS

| | | | |
|---|---|---|---|
| 4,447,950 | 5/1984 | Szycher | 528/76 |
| 4,523,005 | 6/1985 | Szycher | 528/76 |
| 4,579,876 | 4/1986 | Ihopulos | 521/136 |
| 4,621,113 | 11/1986 | Collins | 524/196 |
| 4,822,827 | 4/1989 | Bank et al. | 521/170 |
| 5,057,543 | 10/1991 | Carwell | 521/51 |
| 5,208,315 | 5/1993 | Seneker | 528/67 |

FOREIGN PATENT DOCUMENTS

971184  7/1975  Canada.

OTHER PUBLICATIONS

Structure–Property Relationships of Transparent Aliphatic Polyurethane Elastomers From The Geometric Isomers of Methylene Bis(4–Cyclohexyl Isocyanate), by S.W. Wong and K.C. Frisch.

C.A. Bryne, D.P. Mack and N.S. Schneider, Adv. Urethane Sci. Technol. 9, 77 (Month unavailable) 1984.

A Study of Aliphatic Polyurethane Elastomers Prepared From Diisocyanate Isomer Mixtures, by C.A. Byrne, D.P. Mack & J.M. Sloan, Rubber Chemistry & Technology, vol. 58, pp. 985–996 1985 (month unavailable).

*Primary Examiner*—Rachel Gorr
*Attorney, Agent, or Firm*—Joseph C. Gil; N. Denise Brown

[57] ABSTRACT

This invention relates to novel light stable elastomers which exhibit good dynamic properties, and a process for their preparation. These elastomers comprise the reaction product of an isocyanate propolymer, a chain extender, and a catalyst selected from i) solid delayed action catalysts having a melting point of greater than about 60° C., ii) alkyl substituted organotin catalysts containing alkylmercaptide ligands, and which are liquid at room temperature, and iii) alkyl substituted organotin catalysts containing sulfur bridging groups, and which are liquid at room temperature.

13 Claims, No Drawings

LIGHT STABLE ELASTOMERS HAVING GOOD DYNAMIC PROPERTIES

BACKGROUND OF THE INVENTION

This invention relates to a light stable elastomer comprising an isocyanate prepolymer, a chain extender, and a specific type of catalyst. This invention also relates to a process for the preparation of this light stable elastomer.

Various polyurethanes and elastomers which may be prepared from an isocyanate, a chain extender and optionally a polyol, in the presence of various catalysts are known and described in, for example, U.S. Pat. Nos. 4,447,590, 4,523,005, 4,621,113 and 5,208,315, and Canadian Patent 971,184. The catalysts described in these references are standard polyurethane catalysts such as, for example, dibutyl tin dilaurate or dibutyl tin oxide.

U.S. Pat. Nos. 4,447,590 and 4,523,005 describe the preparation of polyurethanes from diisocyanates, preferably 4,4'-diisocyanato dicyclohexylmethane (HMDI), with a high molecular weight polyether polyol and 1,4-butane diol, preferably in the presence of a catalyst. Suitable catalysts include standard polyurethane catalysts such as N-methyl morpholine, trimethyl amine, triethyl amine, zinc octoate, dibutyl tin dilaurate. These polyurethanes exhibit good thromboresistant properties and are useful for manufacturing blood compatible products.

Aliphatic isocyanate compositions comprising at least about 62.5% of the trans,trans-isomer of 4,4'-diisocyanato dicyclohexylmethane are described in Canadian Patent 971,184. These isocyanate compositions are suitable for preparing non-discoloring coatings and polyurethane elastomers. Elastomers can be prepared by a two-step process wherein an excess of the aliphatic isocyanate composition is reacted with a polyether or polyester glycol or other polyol component, followed by chain extension and/or crosslinking. Alternately, the diisocyanate, polyol and chain extender can be combined in a single reaction step. Suitable catalysts are usually present. Dibutyl tin dilaurate is used as a catalyst in the working example.

U.S. Pat. No. 5,208,315 describes a method for preparing elastomers from 4,4'-diisocyanato dicyclohexylmethane containing about 45 to 100% of the trans,trans-isomer, with a high molecular weight polyol, and little to no chain extender. Catalysts may be used, but are not preferred. Only standard polyurethane catalysts such as, for example, organotin compounds and tertiary amines, are disclosed by the '315 patent.

Polyurethanes comprising the reaction product of an isocyanate-terminated prepolymer with free diisocyanate and a chain extender and optionally, in the presence of a catalyst are disclosed in U.S. Pat. No. 4,621,113. Suitable diisocyanates for the preparation of the prepolymer are aliphatic and cycloaliphatic diisocyanates, and suitable chain extenders include diols, diamines, hydroxylamines, hydrazine, piperazine, etc. Catalysts may be used as long as the amount required to catalyze the reaction will be innocuous as a residue in the polymer. This requirement can be met with tin salts, as long as the FDA limit of 40 ppm tin is not exceeded. Examples of catalysts which meet this requirement include, for example, stannous octoate, stannous oleate, dibutyl tin dioctoate, dimethyl tin dilaurate, or dibutyl tin dilaurate. FORMEZ UL-29 is also disclosed, but is less preferred due to its sulfur content.

It is well known that increasing the trans,trans-isomer content in elastomers based on diisocyanato dicyclohexylmethane (HMDI) isomer mixtures improves the mechanical properties of the elastomers (See the articles titled "Structure-Property Relationships of Transparent Aliphatic Polyurethane Elastomers From the Geometric Isomers of Methylene Bis(4-Cyclohexyl Isocyanate)" by S. W. Wong, K. C. Frisch, C. A. Byrne, D. P. Mack and N. S. Schneider, *Adv. Urethane Sci. Technol.* 9, 77 (1984); and "A Study of Aliphatic Polyurethane Elastomers Prepared from Diisocyanate Isomer Mixtures" by C. A. Byrne, D. P. Mack and J. M. Sloan, Rubber Chemistry and Technology, Vol. 58, pp. 985–996 (1985). Also, the dynamic properties of elastomers based on HMDI having a higher trans,trans-isomer content are superior to the properties of those elastomers based on lower trans,trans-isomer containing mixtures.

We have now found that surprisingly the type of catalyst used to prepare the elastomers based on trans,trans-HMDI significantly influences the dynamic properties of the resultant elastomer. Delayed action catalysts result in improved dynamic performance in the elastomers compared with those that result using conventional urethane catalysts.

SUMMARY OF THE INVENTION

This invention relates to novel light stable elastomers which exhibit good dynamic properties. These light stable elastomers comprise the reaction product of
 a) an isocyanate prepolymer having an isocyanate group content of about 3 to 15% NCO, preferably 4 to 10% NCO, which comprises the reaction product of
  1) 4,4'-diisocyanato dicyclohexyl methane containing at least 90% by weight of the trans,trans-isomer, and
  2) a polyether containing from about 2 to 4 hydroxyl groups and having a molecular weight of from 400 to 8000;
 b) a chain extender containing two hydroxyl groups and having a molecular weight of from 62 to 400; and
 c) a catalyst selected from the group consisting of i) solid delayed action catalysts having a melting point of greater than about 60° C., ii) alkyl substituted organotin catalysts containing alkylmercaptide ligands, and which are liquid at room temperature, and iii) alkyl substituted organotin catalysts containing sulfur bridging groups, and which are liquid at room temperature.

It is also an object of this invention to provide a process for the preparation of these novel light stable elastomers. This process comprises reacting an isocyanate prepolymer (as described above) with a chain extender in the presence of a catalyst, wherein the catalyst is selected from the group consisting of i) solid delayed action catalysts having a melting point of greater than about 600° C., ii) alkyl substituted organotin catalysts containing alkylmercaptide ligands, which are liquid at room temperature, and iii) alkyl substituted organotin catalysts containing sulfur bridging groups, which are liquid at room temperature.

DETAILED DESCRIPTION OF THE INVENTION

Suitable isocyanate prepolymers according to the invention include prepolymers having an isocyanate group content of about 3 to 15%, preferably of about 4 to 10% by weight, and comprising the reaction product of 4,4'-diisocyanato dicyclohexylmethane with a polyether. The 4,4'-diisocyanato dicyclohexylmethane (HMDI) contains at least 90% by weight of the trans,trans-isomer. This high trans,trans-isomer of diisocyanato dicyclohexylmethane can be prepared by various methods known by those skilled in the art. Examples of suitable methods include those described in U.S. Pat. Nos. 4,983,763 and 5,175,350, the disclosures of which are herein incorporated by reference.

Suitable polyethers for preparation of the prepolymer include those containing from about 2 to 4 hydroxyl groups, preferably about 2 hydroxyl groups, having a molecular weight of from about 400 to 8000, preferably from about 1000 to 3000, and having an OH number of from about 20 to about 250, preferably from about 35 to 115. The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water or alcohols. Examples of suitable alcohols include the low molecular weight chain extenders set forth hereinafter, propylene glycol, glycerin, ethylene glycol, trimethylolpropane, 1,4-butanediol, and bisphenol A. It is preferred to use polyethers which contain substantial amounts of primary hydroxyl groups in terminal positions (greater than 80% by weight, based on all of the terminal hydroxyl groups present in the polyether).

Polyether diols are preferably used as component a2) in the present invention. Diols from propylene oxide and/or ethylene oxide with molecular weights of about 400 to 4000 (OH numbers of 280 to 28) based on difunctional starters such as water, ethylene glycol or propylene glycol are preferred. These preferred compounds include copolymers of ethylene oxide and propylene oxide with about 0 to 20% by weight of the oxides being ethylene oxides. Poly (tetramethylene glycol) diols having molecular weights of about 600 to 3000 (OH numbers of 187 to 37) are most preferred.

Suitable chain extenders for the present invention include those which contain two hydroxyl groups and have molecular weights of from 62 to 400. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, neopentyl glycol, cyclohexanedimethanol, 2,2,4-trimethylpentane-1,3-diol and hydroquinone bis(2-hydroxyethyl)ether (commonly referred to as XA). Preferred diols include symmetrical diols having an even number of carbon atoms in the backbone such as, for example, 1,4-butanediol.

Suitable catalysts to be used in accordance with the present invention are selected from the group consisting of i) solid delayed action catalysts having a melting point of greater than about 60° C., ii) alkyl substituted organotin catalysts containing alkylmercaptide ligands (see Structure I below) and which are liquid at room temperature, and iii) alkyl substituted organotin catalysts containing sulfur bridging groups (see Structure II below) and which are liquid at room temperature.

As used herein, the term solid delayed action catalysts refers to those catalysts which are solids at the temperatures where the prepolymer and the chain extender are combined (i.e. the mix temperature), but melt during curing of the elastomers of the present invention. These mix temperatures are generally in the range of about 60° to 80° C., and curing temperatures range from about 80° to 130° C.

When the catalyst is solid at the mix temperature, it does not catalyze the reaction of the liquid phase components (i.e. prepolymer and chain extender). During curing, the solid catalyst melts to form a homogeneous mixture, where the catalyst effectively promotes reaction of the chain extender with the free isocyanate groups of the prepolymer. We believe this behavior results in the delayed action effect of the solid catalysts in the present invention.

Some examples of solid delayed action catalysts having a melting point of greater than about 60° C., and less than about 130° C., include, for example, catalysts such as Witco's EC-77435, TS-446, TS-447 and TS-448. These are all proprietary catalysts developed by Witco. The melting points of these catalysts are set forth in the table below:

| Catalyst | Melting Point |
|---|---|
| EC-77435 | 80–90° C. |
| TS446 | 113° C. |
| TS447 | 80–130° C. |
| TS448 | 80–90° C. |

Suitable alkyl substituted organotin catalysts containing alkylmercaptide ligands and which are liquid at room temperature include, for example, dibutyltin dimercaptide (UL-1), dioctyltin dimercaptide (UL-32), dimethyltin dimercaptide (UL-22), etc.

Examples of suitable alkyl substituted organotin catalysts containing sulfur bridging groups and which are liquid at room temperature include, for example, Topcat 190 and Topcat 290. These are commercially available from Tylo Industries, Parsippany, N.J.

In a particularly preferred embodiment, the catalyst used is a delayed-action catalyst which is liquid at room temperature and has an activation temperature of greater than about 60° C. As used herein, the term "activation temperature" means the temperature at which the latent catalysts becomes activated and accelerates the rate of the urethane forming reaction.

The term "mercaptide" as used in reference to type ii) catalysts, refers to those catalysts corresponding to the general structure:

wherein:
R represents a linear or branched alkyl or cycloalkyl group, preferably a linear or branched alkyl group containing from 4 to 20 carbon atoms;

Me represents a metal, preferably tin; and $R_2'$ represents a linear or branched alkyl or cycloalkyl group, preferably a linear or branched alkyl group containing from 1 to 12 carbon atoms.

The alkyl substituted organotin catalysts containing sulfur bridging groups (type iii) above) as used herein refers to those compounds corresponding to the general structure:

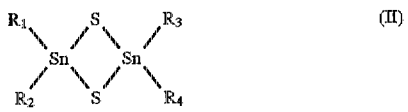

wherein:
$R_1$, $R_2$, $R_3$ and $R_4$ may be the same or different, and each one represents a linear or branched alkyl or cycloalkyl group containing from 1 to 20 carbon atoms, preferably a linear or branched alkyl group containing from 1 to 8 carbon atoms, and most preferably a n-butyl group.

Generally, the catalyst is used in a quantity of about 10 to 500 ppm, preferably 25 to 100 ppm, based on the total weight of the reaction mixture.

In addition, it is of course possible that the elastomers of the present invention include auxiliary agents and additives known in the field of polyurethane chemistry. These materials include anti-oxidants and UV-absorbers, for example hindered phenols, benzophenones, hindered amine light stabilizers (HALS, such as adducts of condensation products prepared from acetone and ammonia), benzotriazoles and the like. The light stabilizers are typically added alone or in mixtures to the blended prepolymer portion of the formulation in amounts up to about 2%, preferably less than about 1%, and most preferably less than about 0.5% based on the total weight of the reaction mixture.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the examples:

Isocyanate A: the trans, trans isomer of dicyclohexylmethane-4,4'-diisocyanate

Polyol A: a polytetramethylene glycol having a functionality of about 2 and an OH number of about 56

Topcat 190: an n-alkyl substituted organotin catalyst, having an activation temperature of about 60°-70° C.; commercially available as Topcat 190 from Tylo Industries, Parsippany, N.J.

EC-77435: a solid delayed action catalyst having a melting point of about 80°-90° C.; commercially available from Witco Corp., Greenwich, Conn.

Fomrez UL-1: a dibutyltin dimercaptide catalyst; commercially available from Witco Corp., Greenwich, Conn.

Fomrez UL-32: a dioctyltin dimercaptide catalyst; commercially available from Witco Corp., Greenwich, Conn.

Coscat 83: a bismuth neodecanoate catalyst; commercially available from Cosan Chemical Company, Carlstadt, N.J.

Fomrez UL-6: a dibutyltin diisooctylmercaptoacetate catalyst, commercially available from Witco Corp., Greenwich, Conn.

Dabco T-12: a dibutyltin dilaurate catalyst, commercially available from Air Products and Chemicals Inc., Allentown, Pa.

Servohydraulic testing has been reported in the literature as a means to measure dynamic properties of PU elastomers. (See paper entitled "Comparison of the Dynamic Properties of Solid Polyurethane Elastomers", by H. J Kogelnik; H. H. Huang; M. Barnes; R. Meichsner; presented at Polyurethanes 90—Proceedings of the SPI 33$^{rd}$ Annual Technical/ Marketing Conference; pp. 207-219 (1990)).

We have used similar servohydraulic testing, as described below, to evaluate dynamic properties of elastomers according to the present invention. The sample, a solid cylinder measuring 13/16" in height and 13/16" in diameter, was placed in an Instron, capable of applying a cyclic load in compression mode. The load on the sample was set to the minimum load (either 45 or 60 pounds). The sample was then subjected to a specified load (either 450 lb. or 600 lb.) and then reduced to the minimum load (either 45 lb. or 60 lb., respectively) at a frequency of 10 load and unload cycles/ second. The number of cycles before failure of the sample was recorded and reported in Tables 1 and 3 below.

Test parameters for the examples were as follows:

|  | Examples in Table 1: | Examples in Table 3: |
| --- | --- | --- |
| Maximum Load: | 450 lbf. | 600 lbf. |
| Mean Load: | 247 lbf. | 330 lbf. |
| Minimum Load: | 45 lbf. | 60 lbf. |
| Load Amplitude: | 202 lbf. | 270 lbf. |

Example 1

Preparation of Prepolymer 1

Isocyanate A (341 g; 2.60 eq.) was melted in an oven (m.p. ~85° C.) and weighed into a 3-necked flask equipped with an overhead stirring unit, a thermocouple and a vacuum take-off/nitrogen inlet. The isocyanate was heated to 100° C. under nitrogen. Polyol A (1000 g.; 1.0 eq.) was pre-heated in an oven to ~80° C. and added to the isocyanate. The mixture was stirred and heated to 100° C. for 4 hours. A sample of the prepolymer (Prepolymer 1 ) was withdrawn and titrated for NCO content using a standard n-butyl amine titration. The NCO content of the prepolymer was 4.57% (theoretical=5.02%).

Example 2

Preparation of Elastomer 2—According to the Invention

The above prepolymer (Prepolymer 1; 191 g.; 0.208 eq) was heated to 80° C. under vacuum (<2 mm Hg) and poured into a preheated (~80° C.) metal can. The chain extender, 1,4-butanediol (8.9 g.; 0.198 eq.) was added to the prepolymer, then a 1% solution of Topcat 190 in Polyol A (6.0 g;) was added, followed by stirring. This resulted in a catalyst concentration of 300 ppm based on the total weight of the casting. The resultant mixture was stirred at high speed for 60 seconds and poured into a pre-heated mold (110° C.). The mold consisted of an 8"×8"×13/16" aluminum plate containing twenty five 13/16" diameter holes bored through the plate resting on a solid 8"×8"×1/8" aluminum plaque. The casting was cured in a vented oven at 110° C. for 30 minutes. The polymer cylinders were demolded and post-cured at 110° C. overnight (18 hours). The parts were stored at ambient temperature for 1 month before testing the dynamic properties.

Example 3a

Preparation of Elastomer 3a—Comparative Example

Prepolymer 1 (191 g.; 0.208 eq) was heated to 80° C. under vacuum (<2 mm Hg) and poured into a preheated (~80° C.) metal can. The chain extender, 1,4-butanediol (8.9 g.; 0.198 eq.), and a 1% solution of Coscat 83 in Polyol A (6.0 g;) was added to the prepolymer. This resulted in a catalyst concentration of 300 ppm based on the total weight of the casting. The mixture was stirred at high speed for 60 seconds and poured into the pre-heated mold (110° C.) as described in Example 2. The casting was cured in a vented oven at 110° C. for 30 minutes. The polymer cylinders were demolded and post-cured at 110° C. overnight (18 hours). The parts were stored at ambient temperature for 1 month before testing the dynamic properties.

Example 3b

Preparation of Elastomer 3b—Comparative Example

Prepolymer 1 (191 g.; 0.208 eq) was heated to 80° C. under vacuum (<2 mm Hg) and poured into a preheated (~80° C.) metal can. The chain extender, 1,4-butanediol (8.9 g.; 0.198 eq.) was added to the prepolymer, followed by addition of a 1% solution of Fomrez UL-6 in Polyol A (6.0 g;), and the mixture was stirred. This resulted in a catalyst concentration of 300 ppm based on the total weight of the casting. The mixture was stirred at high speed for 60 seconds and poured into the pre-heated mold (110° C.) described in Example 2. The casting was cured in a vented oven at 110° C. for 30 minutes. The polymer cylinders were demolded and post-cured at 110° C. overnight (18 hours). The parts were stored at ambient temperature for 1 month before testing the dynamic properties.

The results of dynamic fatigue testing of the elastomers prepared in examples 2 and 3 are summarized in Table 1.

TABLE 1

Dynamic Fatigue Testing of Elastomers from Examples 2 and 3

| Elastomer | # Cycles to Failure[1] |
| --- | --- |
| Elastomer 2 | >18,000[2] |
| Elastomer 3a | 5000 |
| Elastomer 3b | 5000 |

[1]450 pound cyclically applied load
[2]sample did not fail during 450 pound load testing Example 4

Preparation of Prepolymer 2

Isocyanate A (755.6 g; 5.76 eq.) was melted in an oven (m.p. ~85° C.) and weighed into a 3-necked flask equipped with an overhead stirring unit, a thermocouple and a vacuum take-off/nitrogen inlet. The isocyanate was heated to 100° C. under nitrogen. Polyol A (1644 g.; 1.64 eq.) was pre-heated in an oven to ~80° C. and added to the isocyanate. The mixture was stirred and heated to 100° C. for 3.5 hours. A sample of the prepolymer (Prepolymer 2) was withdrawn and titrated for NCO content using a standard n-butyl amine titration. NCO content of the prepolymer was 6.78% (theoretical =7.20%).

Example 5a

Preparation of Elastomer 5a—According to the Invention

Prepolymer 2, from Example 4, (187 g.; 0.302 eq) was heated to 80° C. under vacuum (<2 mm Hg) and poured into a preheated (~80° C.) metal can. The chain extender, 1,4-butanediol (12.9 g.; 0.288 eq.) was added to the prepolymer, followed by addition of a 1% solution of Topcat 190 in Polyol A (2.0 g;), and the mixture was then stirred. This resulted in a catalyst concentration of 100 ppm based on the total weight of the casting. The mixture was stirred at high speed for 60 seconds and poured into the pre-heated mold (110° C.) described in Example 2. The casting was cured in a vented oven at 110° C. for 30 minutes. The polymer cylinders were demolded and post-cured at 110° C. overnight (18 hours). The parts were stored at ambient temperature for 1 month before testing the dynamic properties.

Elastomers 5b, 5c, and 5d were prepared by an analogous procedure used to prepare Elastomer 5a, varying only the catalyst used. These examples are summarized in Table 2.

TABLE 2

Description of Elastomers of Example 5.

| Elastomer | Prepolymer | Chain Extender | Catalyst (type/ppm) |
| --- | --- | --- | --- |
| Elastomer 5a | Example 4 | 1,4-butanediol | Topcat 190; 100 |
| Elastomer 5b | Example 4 | 1,4-butanediol | Fomrez UL-1; 100 |
| Elastomer 5c | Example 4 | 1,4-butanediol | Fomrez UL-32; 100 |
| Elastomer 5d | Example 4 | 1,4-butanediol | EC-77435; 100 |

Example 6a

Preparation of Elastomer 6a—Comparative Example

Prepolymer 2, from Example 4, (187 g.; 0.302 eq) was heated to 80° C. under vacuum (<2 mm Hg) and poured into a preheated (~80° C.) metal can. The chain extender, 1,4-butanediol (12.9 g.; 0.288 eq.), was added to the prepolymer, followed by addition of a 1% solution of Dabco T-12 in Polyol A (2.0 g;), and then the mixture was stirred. This resulted in a catalyst concentration of 100 ppm based on the total weight of the casting. The mixture was stirred at high speed for 60 seconds and poured into the pre-heated mold (110° C.) described in Example 2. The casting was cured in a vented oven at 110° C. for 30 minutes. The polymer cylinders were demolded and post-cured at 110° C. overnight (18 hours). The parts were stored at ambient temperature for 1 month before testing the dynamic properties.

Example 6b

Preparation of Elastomer 6b—Comparative Example

Prepolymer 2 (187 g.; 0.302 eq), from Example 4, was heated to 80° C. under vacuum (<2 mm Hg) and poured into a preheated (~80° C.) metal can. The chain extender, 1,4-butanediol (12.9 g.; 0.288 eq.), was added to the prepolymer, followed by addition of a 1% solution of Fomrez UL-6 in Polyol A (2.0 g;), and then the mixture was stirred. This resulted in a catalyst concentration of 100 ppm based on the total weight of the casting. The mixture was stirred at high speed for 60 seconds and poured into the pre-heated mold (110° C.) described in Example 2. The casting was cured in a vented oven at 110° C. for 30 minutes. The polymer cylinders were demolded and post-cured at 110° C. overnight (18 hours). The parts were stored at ambient temperature for 1 month before testing the dynamic properties.

The results of dynamic fatigue testing of the elastomers prepared in examples 5 and 6 are summarized in Table 3.

TABLE 3

Dynamic Fatigue Testing of Elastomers from Examples 5 and 6

| Elastomer | # Cycles to Failure[1] |
| --- | --- |
| Elastomer 5a | >18,000[2] |
| Elastomer 5b | >18,000[2] |

TABLE 3-continued

Dynamic Fatigue Testing of Elastomers from Examples 5 and 6

| Elastomer | # Cycles to Failure[1] |
|---|---|
| Elastomer 5c | >18,000[2] |
| Elastomer 5d | >18,000[2] |
| Elastomer 6a | 8200 |
| Elastomer 6b | 1800 |

[1]600 pound cyclically applied load
[2]sample did not fail during 600 pound load testing Examples 2, 5a, 5b, 5c and 5d were prepared using polymers and catalysts of the type claimed in the invention. The comparative examples 3a, 3b and 6a and 6b illustrate that by varying only the catalyst used, the dynamic properties suffer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A light stable elastomer comprising
   a) an isocyanate prepolymer having an isocyanate group content of 3 to 15% NCO, and comprising the reaction product of
      1) 4,4'-diisocyanato dicyclohexyl methane containing at least 90% by weight of the trans,trans-isomer, and
      2) a polyether containing from about 2 to 4 hydroxyl groups and having a molecular weight of from 400 to 4000;
   b) a chain extender containing two hydroxyl groups and having a molecular weight of from 62 to 400; and
   c) a catalyst selected from the group consisting of i) solid delayed action catalysts having a melting point of greater than about 60° C., ii) alkyl substituted organotin catalysts containing alkylmercaptide ligands, said catalysts being liquid at room temperature, and iii) alkyl substituted organotin catalysts containing sulfur bridging groups, said catalysts being liquid at room temperature.

2. The light stable elastomer of claim 1, wherein said catalyst is i) a solid delayed action catalyst having a melting point of greater than about 60° C. and less than about 130° C.

3. The light stable elastomer of claim 1, wherein c) ii) said alkyl substituted organotin catalyst containing alkylmercaptide ligands comprises a dibutyltin dimercaptide catalyst, or a dioctyltin dimercaptide catalyst.

4. The light stable elastomer of claim 1, wherein c) iii) said alkyl substituted organotin catalyst containing bridging groups corresponds to the general structure:

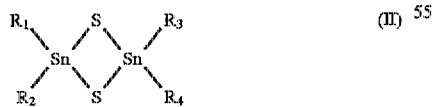

(II)

wherein:

$R_1$, $R_2$, $R_3$ and $R_4$ may be the same or different, and each one represents a linear or branched alkyl or cycloalkyl group containing from 1 to 20 carbon atoms.

5. The light stable elastomer of claim 4, wherein $R_1$, $R_2$, $R_3$ and $R_4$ of structure (II), may be the same or different, and each represents a linear or branched alkyl group containing from 1 to 8 carbon atoms.

6. The light stable elastomer of claim 4, wherein $R_1$, $R_2$, $R_3$ and $R_4$ of structure (II) each represents an n-butyl group.

7. A process for the preparation of a light stable elastomer comprising reacting
   a) an isocyanate prepolymer having an isocyanate group content of 3 to 15%, wherein said prepolymer comprises the reaction product of
      1) 4,4'-diisocyanato dicyclohexylmethane containing at least 90% by weight of the trans,trans-isomer, and
      2) a polyether containing from about 2 to 4 hydroxyl groups and having a molecular weight of from 400 to 4000, with
   b) a chain extender containing two hydroxyl groups and having a molecular weight of from 62 to 400, and
   c) a catalyst selected from the group consisting of i) solid delayed action catalysts having a melting point of greater than about 60° C., ii) alkyl substituted organotin catalysts containing alkylmercaptide ligands, said catalysts being liquid at room temperature, and iii) alkyl substituted organotin catalysts containing sulfur bridging groups, said catalysts being liquid at room temperature.

8. The process of claim 7, wherein said catalyst is i) a solid delayed action catalyst having a melting point of greater than about 60° C. and less than about 130° C.

9. The process of claim 7, wherein c) ii) said alkyl substituted organotin catalyst containing alkylmercaptide ligands comprises a dibutyltin dimercaptide catalyst, or a dioctyltin dimercaptide catalyst.

10. The process of claim 7, wherein c) iii) said alkyl substituted organotin catalyst containing bridging groups corresponds to the general structure:

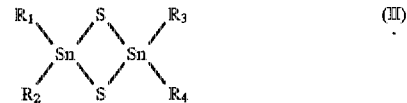

(II)

wherein:

$R_1$, $R_2$, $R_3$ and $R_4$ may be the same or different, and each one represents a linear or branched alkyl or cycloalkyl group containing from 1 to 20 carbon atoms.

11. The process of claim 10, wherein $R_1$, $R_2$, $R_3$ and $R_4$ of structure (II), may be the same or different, and each represents a linear or branched alkyl group containing from 1 to 8 carbon atoms.

12. The process of claim 10, wherein $R_1$, $R_2$, $R_3$ and $R_4$ of structure (II) each represents an n-butyl group.

13. A light stable elastomer comprising
   a) a isocyanate prepolymer having an isocyanate group content of 3 to 15% NCO, and comprising the reaction product of
      1) 4,4'-diisocyanato dicyclohexyl methane containing at least 90% by weight of the trans,trans-isomer, and
      2) a polyether containing from about 2 to 4 hydroxyl groups and having a molecular weight of from 400 to 4000;
   b) a chain extender containing two hydroxyl groups and having a molecular weight of from 62 to 400; and
   c) a delayed-action catalyst which is liquid at room temperature and having an activation temperature of at least 60° C.

* * * * *